(12) United States Patent
Diab et al.

(10) Patent No.: US 9,515,843 B2
(45) Date of Patent: Dec. 6, 2016

(54) METHOD AND SYSTEM FOR LINK ADAPTIVE ETHERNET COMMUNICATIONS

(75) Inventors: Wael William Diab, San Francisco, CA (US); Scott Powell, Carlsbad, CA (US)

(73) Assignee: BROADCOM CORPORATION, Irvine, CA (US)

( * ) Notice: Subject to any disclaimer, the term of this patent is extended or adjusted under 35 U.S.C. 154(b) by 1545 days.

(21) Appl. No.: 12/625,342

(22) Filed: Nov. 24, 2009

(65) Prior Publication Data

US 2011/0007664 A1 Jan. 13, 2011

Related U.S. Application Data

(60) Provisional application No. 61/224,631, filed on Jul. 10, 2009.

(51) Int. Cl.
| | |
|---|---|
| *H04L 12/28* | (2006.01) |
| *H04L 12/40* | (2006.01) |
| *H04L 1/00* | (2006.01) |

(52) U.S. Cl.
CPC ......... *H04L 12/40136* (2013.01); *H04L 1/001* (2013.01)

(58) Field of Classification Search
None
See application file for complete search history.

(56) References Cited

U.S. PATENT DOCUMENTS

| 6,724,829 B1 | 4/2004 | Tzukerman et al. | |
|---|---|---|---|
| 6,763,097 B1 | 7/2004 | Vitenberg | |
| 7,539,184 B2 * | 5/2009 | Campini et al. | 370/388 |
| 7,848,398 B2 * | 12/2010 | Fernandez | 375/222 |
| 2004/0141561 A1 * | 7/2004 | Santhoff et al. | 375/257 |
| 2006/0271355 A1 * | 11/2006 | Wang | G10L 19/005 704/220 |
| 2007/0208565 A1 * | 9/2007 | Lakaniemi | G10L 19/008 704/268 |
| 2007/0258514 A1 * | 11/2007 | Wajcer et al. | 375/222 |
| 2008/0101479 A1 * | 5/2008 | Sefidvash | 375/258 |
| 2009/0274170 A1 * | 11/2009 | Yu et al. | 370/466 |
| 2009/0316718 A1 * | 12/2009 | Traeber | 370/463 |
| 2009/0316722 A1 * | 12/2009 | Traeber | 370/468 |

* cited by examiner

*Primary Examiner* — John Blanton
*Assistant Examiner* — Thinh Tran
(74) *Attorney, Agent, or Firm* — Foley & Lardner LLP; Christopher J. McKenna; Helen H. Zhang

(57) ABSTRACT

Aspects of a method and system for link adaptive Ethernet communications are provided. In this regard, characteristics of a cable attached to a network device may be determined, and the network device may be configured based on the determined characteristics. One or more of a plurality of Ethernet PHYs within the network device may be selected to be utilized for communicating over the cable based on the determined characteristics of the cable. The selected Ethernet PHYs may be configured based on the determined characteristics. A modulation scheme utilized by the selected Ethernet PHYs may be configured based on the determined characteristics. A modulation scheme utilized by each of the selected Ethernet PHYs may be configured independently from a modulation scheme utilized by other ones of the selected Ethernet PHYs.

20 Claims, 10 Drawing Sheets

METHOD AND SYSTEM FOR LINK ADAPTIVE ETHERNET COMMUNICATIONS

CROSS-REFERENCE TO RELATED APPLICATIONS/INCORPORATION BY REFERENCE

This patent application makes reference to, claims priority to and claims benefit from U.S. Provisional Patent Application Ser. No. 61/224,631 filed on Jul. 10, 2009.

This application also makes reference to:
U.S. patent application Ser. No. 11/473,205 filed on Jun. 22, 2006;
U.S. patent application Ser. No. 11/470,515 filed on Sep. 6, 2006;
U.S. patent application Ser. No. 11/686,867 filed on Mar. 15, 2007;
U.S. patent application Ser. No. 11/686,852 filed on Mar. 15, 2007;
U.S. patent application Ser. No. 12/495,496 filed on Jun. 30, 2009; and
U.S. patent application Ser. No. 12/490,209 filed on Jun. 23, 2009.

The above stated application is hereby incorporated herein by reference in its entirety.

FIELD OF THE INVENTION

Certain embodiments of the invention relate to networking. More specifically, certain embodiments of the invention relate to a method and system for link adaptive Ethernet communications.

BACKGROUND OF THE INVENTION

With the increasing popularity of electronics such as desktop computers, laptop computers, and handheld devices such as smart phones and PDA's, communication networks are becoming an increasingly popular means of exchanging data of various types and sizes for a variety of applications. One set of networking technologies, namely Ethernet, has been particularly successful with regard to deployment in local area networks (LANs) and has made networking useful and affordable to individual and business customers of all levels and sizes. Everyday more and more devices are being equipped with Ethernet interfaces and Ethernet is increasingly being utilized to carry information of all types and sizes including voice, data, and multimedia. Due to the ubiquity of Ethernet in LANs, the advantages of using Ethernet in wide area networks are being recognized and Efforts such as Ethernet in the First Mile IEEE 802.3ah seek to realize these advantages. As the role of Ethernet expands to networks of all topologies and/or technologies, however, equipment manufacturers, service providers, and network administrators are presented with new economic and technological challenges.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for link adaptive Ethernet communications, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for next generation Ethernet physical layer devices. In various embodiments of the invention, characteristics of a cable attached to a network device may be determined, and the network device may be configured based on the determined characteristics. One or more of a plurality of Ethernet PHYs within the network device may be selected to be utilized for communicating over the cable based on the determined characteristics of the cable. The selected Ethernet PHYs may be configured based on the determined characteristics. The cable may comprise a twisted pair cable and the characteristics may comprise a category of the cable, whether the cable is shielded, and/or a length of the cable. A modulation scheme utilized by the selected Ethernet PHYs may be configured based on the determined characteristics. A modulation scheme utilized by each of the selected Ethernet PHYs may be configured independently from a modulation scheme utilized by other ones of the selected Ethernet PHYs. One or more of the selected Ethernet PHYs may be configured based on interference present on the cable.

One or more of the selected Ethernet PHYs may be configured to operate in duplex or simplex mode for communication over the cable based on the determined characteristics. For one or more selected Ethernet PHYs operating in simplex mode, which channels of the cable may be utilized for outbound traffic and which channels may be utilized for inbound traffic may be configured based on one or more of: traffic patterns on the cable, one or more applications running on the network device, one or more applications running on a link partner communicatively coupled to the network device, and functions performed by the networking device.

Figure 1A:
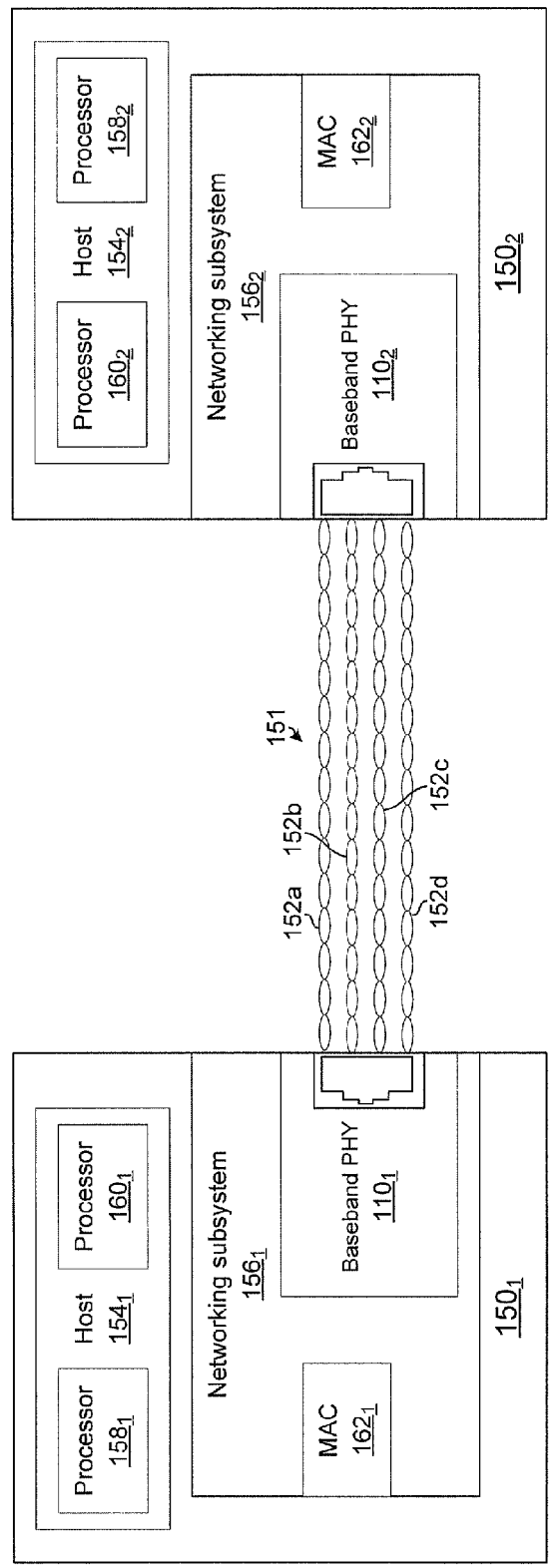
FIG. 1A illustrates full-duplex communications over 4 twisted pairs between two network devices 150, in accordance with an embodiment of the invention.

FIG. 1A illustrates full-duplex communications over 4 twisted pairs between two network devices 150, in accordance with an embodiment of the invention. Referring to FIG. 1A, there is shown network devices $150_1$ and $150_2$ each referred to generically as network device $150_X$, where the 'X' represents either the subscript 1 or 2. Each network device $150_X$ may comprise a corresponding host $154_X$ and a corresponding networking subsystem $156_X$. Each host $154_X$ may comprise a corresponding processor $158_X$ and a corresponding memory $160_X$. Each networking subsystem $156_X$ may comprise a corresponding MAC $162_X$ and a corresponding baseband Ethernet PHY $110_X$.

Each host $154_X$ may be operable to handle functionality of OSI layer 3 and above in the network devices 102 and 104, respectively. The host $154_X$ may be operable to perform system control and management, and may comprise hardware, software, or a combination thereof. For example each host $154_X$ may comprise a processor $158_X$ and memory $160_X$. Each host $154_X$ may communicate with the corresponding networking subsystem $156_X$ via, for example, a PCI or other similar or suitable interface.

Each networking subsystem $156_X$ may comprise suitable logic, circuitry, and/or code that may be operable to handle functionality of OSI layer 1 and higher OSI layers in the network device $150_X$, respectively. Each networking subsystem $156_X$ may be operable to implement switching, routing, and/or network interface card (NIC) functions. Each networking subsystem $156_X$ may be operable to implement Ethernet protocols, such as those based on the IEEE 802.3 standard, for example, but is not limited in this regard.

Each network subsystem $156_X$ may support transmission and/or reception at a high(er) data in one direction and transmission and/or reception at a low(er) data rate in the other direction. For example, a network device $150_X$ may comprise a multimedia server and a link partner of the network device $150_X$ may comprise a multimedia client. In this regard, the network device $150_X$ may transmit multimedia data, for example, to the link partner at high(er) data rates while the link partner may transmit control or auxiliary data associated with the multimedia content at low(er) data rates. Each network device $150_X$ may also support wireless protocols such as the IEEE 802.11 family of standards. Each network subsystem $156_X$ may comprise, for example, a MAC $162_X$ and an Ethernet PHY $110_X$.

Each baseband Ethernet PHY $110_X$ may comprise a twisted pair Ethernet PHY capable of operating at a variable data rate. In this regard, each baseband Ethernet PHY $110_X$ may be operable to adjust a data rate at which it communicates based on characteristics of the cable 151 over which it communicates. In an exemplary embodiment of the invention, each baseband Ethernet PHY $110_X$ may be operable to communicate at approximately any data rate less than or equal to 40 Gbps. In this regard, each baseband Ethernet PHY $110_X$ may not be constrained to specific data rates such as a conventional baseband Ethernet PHY that is constrained to communicating at one or more of 10 Mbps, 100 Mbps, 1 Gbps, and/or 10 Gbps. Each baseband Ethernet PHY $110_X$ may support various encoding techniques such as PAM-2, PAM-3, PAM-5, PAM-8, PAM-10, PAM-12, PAM-16, PAM-32, PAM-64, 16-QAM, 64-QAM, 128-QAM, 256-QAM, and QAM, PAM, or other encoding techniques with other and/or higher numbers of encoding levels.

Each MAC $162_X$ may comprise suitable logic, circuitry, interfaces, and/or code that may be operable to perform data encapsulation and/or media access management, where media access management may comprise operations that handle conflicts arising from multiple network devices sharing the cable 151. In this regard, each MAC $162_X$ may provide an interface between a corresponding baseband Ethernet PHY $110_X$ and a corresponding host $154_X$. Each MAC $162_X$ may communicate with a corresponding host $162_X$ via a PCI or similar bus and may communicate with a corresponding baseband Ethernet PHY $110_X$ via a media independent interface (xxMII). In this regard, "media independent interface (xxMII)" is utilized generically herein and may refer to a variety of interfaces including, but not limited to, a media independent interface (MII), a gigabit MII (GMII), a reduced MII (RMII), reduced gigabit MII (RGMII), and 10 gigabit MII (XGMII). The xxMll may comprise a carrier sense signal (CRS) which may be utilized to manage a rate at which data is communicated between a baseband Ethernet PHY $110_X$ and a corresponding MAC $162_X$, as described below with respect to FIG. 1B.

In various embodiments of the invention each network subsystem $156_X$ may be operable to implement one or more energy efficient features, which may be referred to as energy efficient networking (EEN), or in the specific case of Ethernet, energy efficient Ethernet (EEE). For example, each baseband Ethernet PHY $110_X$ may be operable to support low power idle (LPI) and/or subset PHY, also referred to as sub-rating, techniques. LPI may generally refer a family of techniques where, instead of transmitting conventional IDLE symbols during periods of inactivity, a PHY of a network subsystem $156_X$ may remain silent and/or communicate signals other than conventional IDLE symbols. Sub-rating, or sub-set PHY, may generally refer to a family of techniques where a PHYs is reconfigurable, in real-time or near real-time, to communicate at different data rates and, in particular, at lower data rates while operating in an energy-saving mode.

The cable 151 may comprise, for example, one or more twisted pairs 152. In various embodiments of the invention, the cable 151 may comply with Cat-3, Cat-5, Cat-5e, Cat-6, Cat-7, Cat-7a, Cat-7a+ or future cable specifications. However, the cable 151 is not limited to twisted pair and could comprise, for example, a coaxial cable. Additionally, the cable 151 may be of any length. The cable 151 may be characterized in a number of ways such as the length of the cable 151, whether the cable 151 is shielded, the temperature of the cable, the insertion loss of the cable 151, and/or undesired signals, such as noise, interference, and/or crosstalk present and/or incident on the cable.

In operation, the network devices $150_1$ and $150_2$ may communicate over the cable 151. The data rate at which the network devices $150_1$ and $150_2$ communicate may depend on characteristics of the cable 151. Additionally or alternatively, whether the network devices $150_1$ and $150_2$ communicate in a duplex or simplex mode may depend on characteristics of the cable 151. Accordingly, the network devices $150_1$ and $150_2$ may be operable to determine the characteristics of the cable 151. The characteristics of the cable 151 may be, for example, determined via measurements performed independently by each of the network devices $150_1$ and $150_2$. For example, a network device $150_X$ may perform a conductivity test to determine whether the cable 151 is shielded and/or may measure signal reflections to determine a length of the cable 151. Characteristics of the cable 151 may be, for example, determined via communications between the network devices 150$_1$ and 150$_2$. For example, a length of the cable 151 may be determined based on one-way and/or round-trip delay of packets communicated between the network devices 150$_1$ and 150$_2$.

In some embodiments of the invention, a baseband Ethernet PHY 110$_X$ may also be configured based on its power consumption constraints and/or requirements.

Figure 1B:
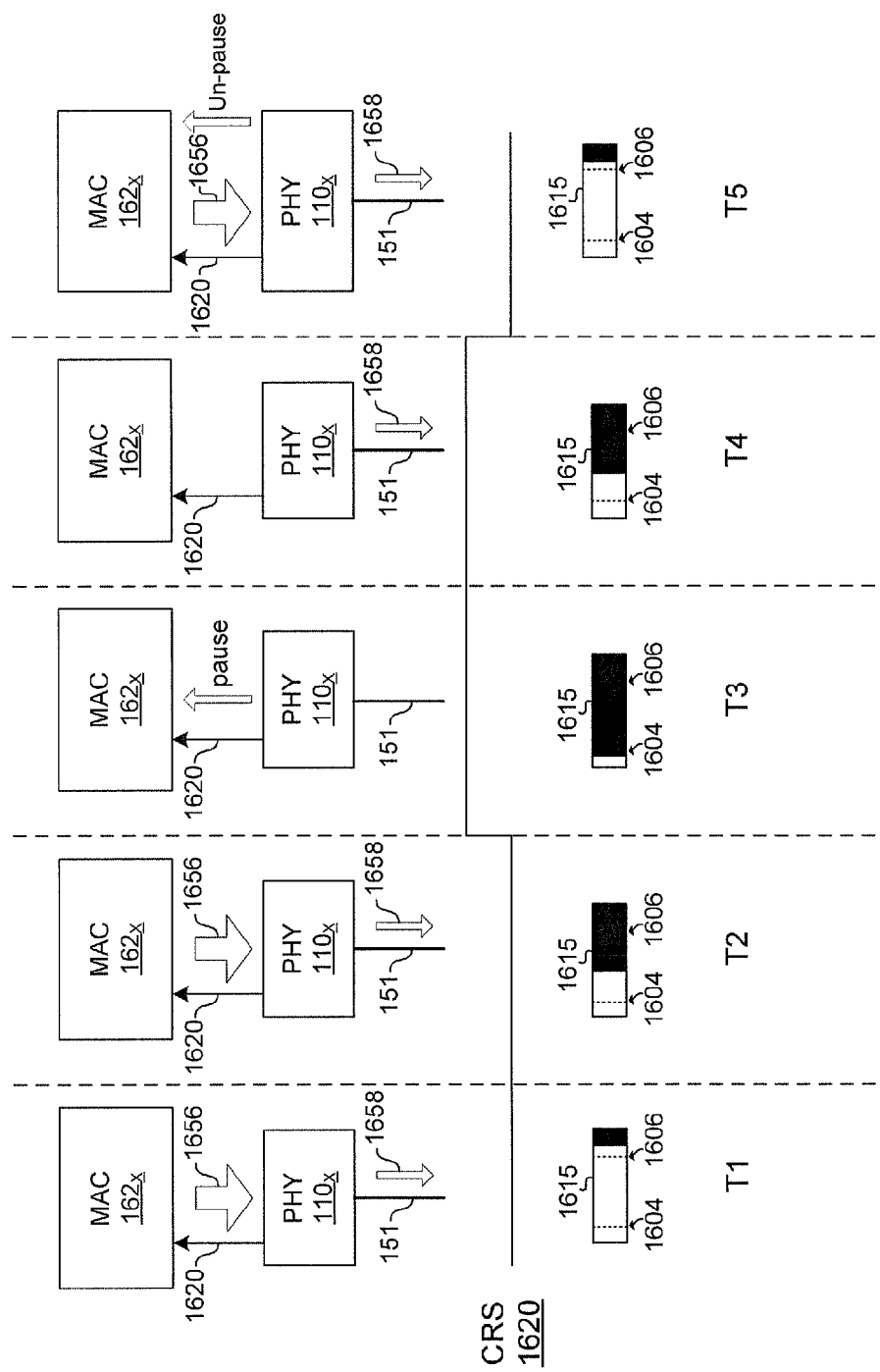
FIG. 1B is a diagram illustrating managing data transmission via a carrier sense signal of a media independent interface, in accordance with an embodiment of the invention.

FIG. 1B is a diagram illustrating managing data transmission via a carrier sense signal of a media independent interface, in accordance with an embodiment of the invention. Referring to FIG. 1B there is shown a MAC 162$_X$, a baseband Ethernet PHY 110$_X$, a queue 1615, and corresponding values of a CRS 1620 during a sequence of time instants T1-T5. The baseband Ethernet PHY 110$_X$ and the MAC 162$_X$ may be as described with respect to FIG. 1A.

At time instant T1, the queue 1615 is not, or has not been, filled above the threshold 1604. Accordingly, the CRS 1620 is de-asserted and the MAC 162$_X$ is communicating data to the baseband Ethernet PHY 110$_X$ at a high(er) data rate (as indicated by the large arrow 1656) and the baseband Ethernet PHY 110$_X$ is transmitting data onto the cable 151 a low(er) rate (as indicated by the small arrow 1658), where the rate at which the baseband Ethernet PHY 110$_X$ transmits onto the cable 151 may be determined based on characteristics of the cable 151.

At time instant T2, the queue 1615 may have more data buffered in it than at time instant T1; however, the amount of data has still not surpassed the threshold 1604 and thus the CRS 1620 remains de-asserted and the data continues to be communicated from the MAC 162$_X$ to the baseband Ethernet PHY 110$_X$.

At time instant T3, the amount of data in the queue 1615 has risen above the threshold 1604 and thus the CRS 1620 may be asserted and/or a pause frame may be generated and conveyed to the MAC 162$_X$. The baseband Ethernet PHY 110$_X$ may continue to drain the queue 1615 by transmitting data onto the cable 151.

At time instant T4, the baseband Ethernet PHY 110$_X$ may continue to transmit data and drain the queue 1615; however, hysteresis may be utilized to prevent rapid toggling of the CRS 1620 and thus, the CRS 1620 may be de-asserted only when the level of data in the queue 1615 drops below the threshold 1606. Accordingly, the CRS 1620 may remain asserted and communication from the MAC 162$_X$ to the baseband Ethernet PHY 110$_X$ may remain paused.

At time instant T5, the amount of data in the queue 1615 may drop below the threshold 1606, accordingly the CRS 1620 may be de-asserted and/or a pause frame may be generated and conveyed to the MAC 162$_X$ and data may again be communicated from the MAC 162$_X$ to the baseband Ethernet PHY 110$_X$.

Thus, the baseband Ethernet PHY 110$_X$ may utilize the CRS 1620 to throttle the rate at which data is communicated to the baseband Ethernet PHY 110$_X$. Accordingly, in instances that a baseband Ethernet baseband Ethernet PHY 110$_X$ is operable to communicate at speeds such as 40 Gbps or 100 Gbps, CRS 1620 may be utilized to support legacy cabling and/or Ethernet installations.

Figure 1C:
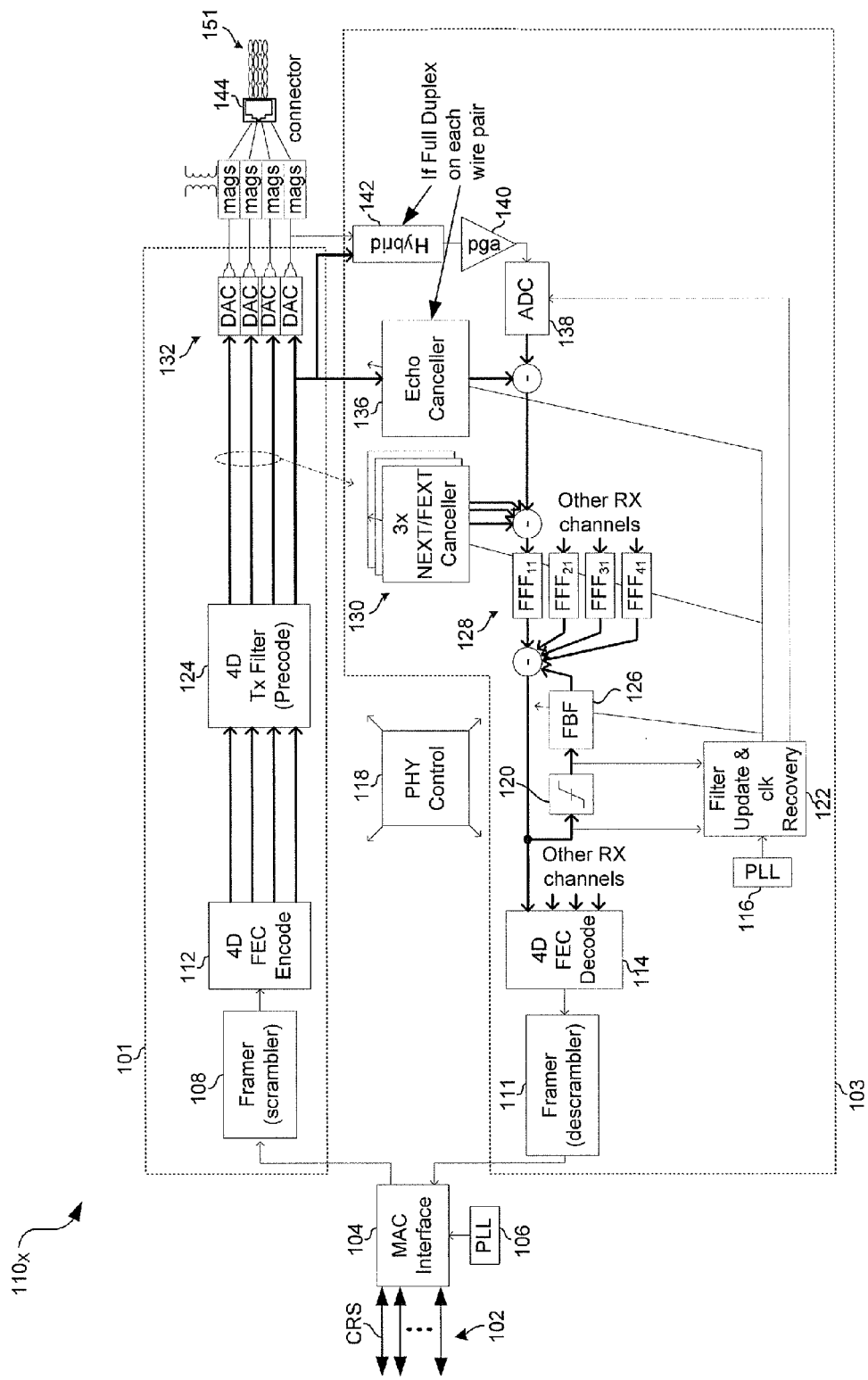
FIG. 1C is a diagram illustrating an exemplary baseband Ethernet PHY configured for duplex communication, in accordance with an embodiment of the invention

FIG. 1C is a diagram illustrating an exemplary baseband Ethernet PHY configured for duplex communication, in accordance with an embodiment of the invention. Shown in FIG. 1C are four channels of a transmit portion 101 and one of four channels of a receive portion 103 of the baseband Ethernet PHY 110$_X$. The transmit portion 101 comprises framing/scrambling module 108, FEC encoder 112, precoding module 124, and digital-to-analog converter (DAC) 132. The receive path 103 comprises framing/descrambling module 111, FEC decoder 114, a PLL 116, slicer 120, feedback and clock recovery module 122, feedback filter 126, feed forward filtering module 128, crosstalk cancellation module 130, Echo cancellation module 136, analog-to-digital converter 138, programmable gain amplifier (PGA) 140, and hybrid 142. Components utilized by both transmit and receive paths comprise the MAC interface module 104, the PLL 106, the control module 118, the magnetics module 134, and the connector 144. The various components and/or modules of the baseband Ethernet PHY 110 may be realized as dedicated hardware (e.g., an application specific integrated circuit (ASIC), as functions performed by a processor, as modules realized in a programmable device (e.g., FPGA), or a combination thereof.

The framing module 108 may comprise suitable logic, circuitry, interfaces, and/or code that may be operable to adapt a signal of a first bit-width from the MAC interface 104 with a signal of a second bit-width input to the FEC encoder 112.

The framing/descrambling module 111 may comprise suitable logic, circuitry, interfaces, and/or code that may be operable to adapt a signal of a first bit-width from the FEC decoder 114 with a signal of a second bit-width input to MAC interface 104.

The control module 118 may comprise suitable logic, circuitry, interfaces, and/or code for managing operations of the various functions and/or modules of the baseband Ethernet PHY 110$_X$. In some embodiments of the invention, the control module 118 may be operable to detect one or more characteristics of the cable 151 and adjust operation of one or more of the components of the baseband Ethernet PHY 110$_X$ based on the characteristics. For example, the control module 118 may be operable to configure the baseband Ethernet PHY 110$_X$ into a simplex or duplex mode of operation based on the characteristics. Additionally, in either simplex or duplex mode, the control module 118 may be operable to adjust a data rate at which the baseband Ethernet PHY 110$_X$ communicates over the cable 151. In this regard, the rate at which the baseband Ethernet PHY 110$_X$ communicates may be controlled by adjusting one or more clock frequencies, by adjusting inter-packet gap times, by adjusting a number of channels of the cable 151 over which the baseband Ethernet PHY 110$_X$ communicates, and/or by adjusting a modulation and/or encoding scheme utilized by the baseband Ethernet PHY 110$_X$.

The forwarded error correction (FEC) encoder 112 may comprise suitable logic, circuitry, interfaces and/or code that may be operable to modify blocks of data to enable a receiver to detect errors that may have been introduced during transmission and/or reception.

The FEC decoder 114 may comprise suitable logic, circuitry, interfaces, and/or code that may be operable to process received data that has been encoded utilizing FEC to detect errors in received data and correct the errors if possible.

The precoding module 124 may comprise suitable logic, circuitry, interfaces, and/or code that may be operable to manipulate and/or modify signals in anticipation of interference that will occur either in the remainder of the transmit path of the Ethernet baseband Ethernet PHY 110$_X$ and/or in the channel over which the signal is transmitted. In this regard, the manipulation and/or modification of the signal may pre-cancel the effects of the anticipated interference. In an exemplary embodiment of the invention, the precoding module may implement Tomlinson-Harashima precoding.

The feed forward filter (FFF) module 128 may comprise suitable logic, circuitry, interfaces and/or code that may enable removal of precursor inter-symbol interference (ISI) to make the channel minimum-phase and to whiten the noise in the channel. In some embodiments of the invention, the forward equalizer 128 may be configurable and may be configured during manufacture, during installation, and/or during operation. For example, coefficients and/or resolution of the equalizer may be configurable. Additionally or alternatively, the FFF 128 may be enabled and disabled.

The slicer 120 may comprise suitable logic, circuitry, interfaces, and/or code that may be operable to determine a symbol at its input. In this regard, wen symbols have been degraded by the communication channel, the slicer 120 may determine the most likely symbol and may restore the levels of the signal.

The echo cancellation module 136 may comprise suitable logic, circuitry, interfaces and/or code that may enable canceling at least a portion of the ECHO component received in the twisted-pair wire from the local transmitter on the same twisted-pair wire.

The crosstalk cancellation module 130 may comprise suitable logic, circuitry, interfaces and/or code that may enable canceling at least a portion of the near-end crosstalk (NEXT) component received in the twisted-pair wire from the local transmitters corresponding to the three adjacent twisted-pair wires and a far-end crosstalk (FEXT) component received in the twisted pair wire from the remote transmitters corresponding to the three adjacent twisted-pair wires.

The digital-to-analog converter (DAC) 132 may comprise suitable logic, circuitry, interfaces, and/or code that may be operable to convert digital signals to an analog current and/or voltage. In various embodiments of the invention, the range, resolution, linearity, and/or other characteristics of the DAC 132 may be variable and may be configured by, for example, one or more signals from the control module 118.

The analog-to-digital converter (ADC) 138 may comprise suitable logic, circuitry, interfaces, and/or code that may be operable to convert analog voltages and/or currents to a digital representation. The range, resolution, linearity, and/or other characteristics of the ADC 138 may be variable and may be configured by, for example, one or more signals from the control module 118. In some embodiments of the invention, the ADC 138 may be configurable and may be configured during manufacture, during installation, and/or during operation. For example, resolution, linearity, and/or power consumption of the ADC 138 may be configured. Additionally or alternatively, the ADC 138 may be enabled and disabled. The ADC 138 may also be operable to provide a variable gain to the analog signals it generates. The gain may be variable and may be controlled by, for example, one or more signals from the control module 118. The gain may be configurable and may be configured during manufacture, during installation, and/or during operation.

The PGA 140 may comprise suitable logic, circuitry, interfaces, and/or code that may be operable to increase the signal strength of received signals. The gain of the PGA 140 may be variable and may be controlled by, for example, one or more signals from the control module 118.

The PLLs 116 and 106 may each comprise suitable logic, circuitry, interfaces, and/or code that may be operable generate one or more clock signals. The PLLs 116 and 106 may generate a clock frequency by dividing a reference frequency, where the reference frequency may be an integer of a fraction of an integer.

In various embodiments of the invention, a Ethernet PHY 110 may comprise a subset of the modules depicted in FIG. 1A and/or may comprise additional modules and/or functionality. For example, a next generation baseband Ethernet PHY 110$_X$ may not comprise a feedback filter 126. Additionally, various modules of the baseband Ethernet PHY 110$_X$ may be linear systems and thus the order and/or arrangement of the various linear modules may be altered without changing the functionality of the baseband Ethernet PHY 110$_X$. Also, various modules and/or functions depicted as occurring in the digital domain may be implemented in the analog domain. For example, the feed forward filters 128 may be analog filters and may be ahead of the ADC 138 in the receive path.

In operation, the baseband Ethernet PHY 110 may be configured based on characteristics of the cabling over which it communicates. Exemplary characteristics comprise length of the cable, category of the cable, environmental conditions in which the cable is installed, and whether the cable is shielded. In this regard, in various embodiments of the invention, the baseband Ethernet PHY 110$_X$ may be operable to communicate—at least at some minimal data rate—over any type of cabling from CAT-1 to CAT-7A or higher. In this regard, in various embodiments of the invention, the rate at which the baseband Ethernet PHY 110$_X$ communicates and/or how the Ethernet PHY 110$_X$ communicates may be configured based on the cabling over which it communicates and/or the link partner with which it communicates. As described above in FIG. 1B, the rate at which the baseband Ethernet PHY 110$_X$ communicates may be throttled or managed via a carrier sense signal.

Figure 1D:
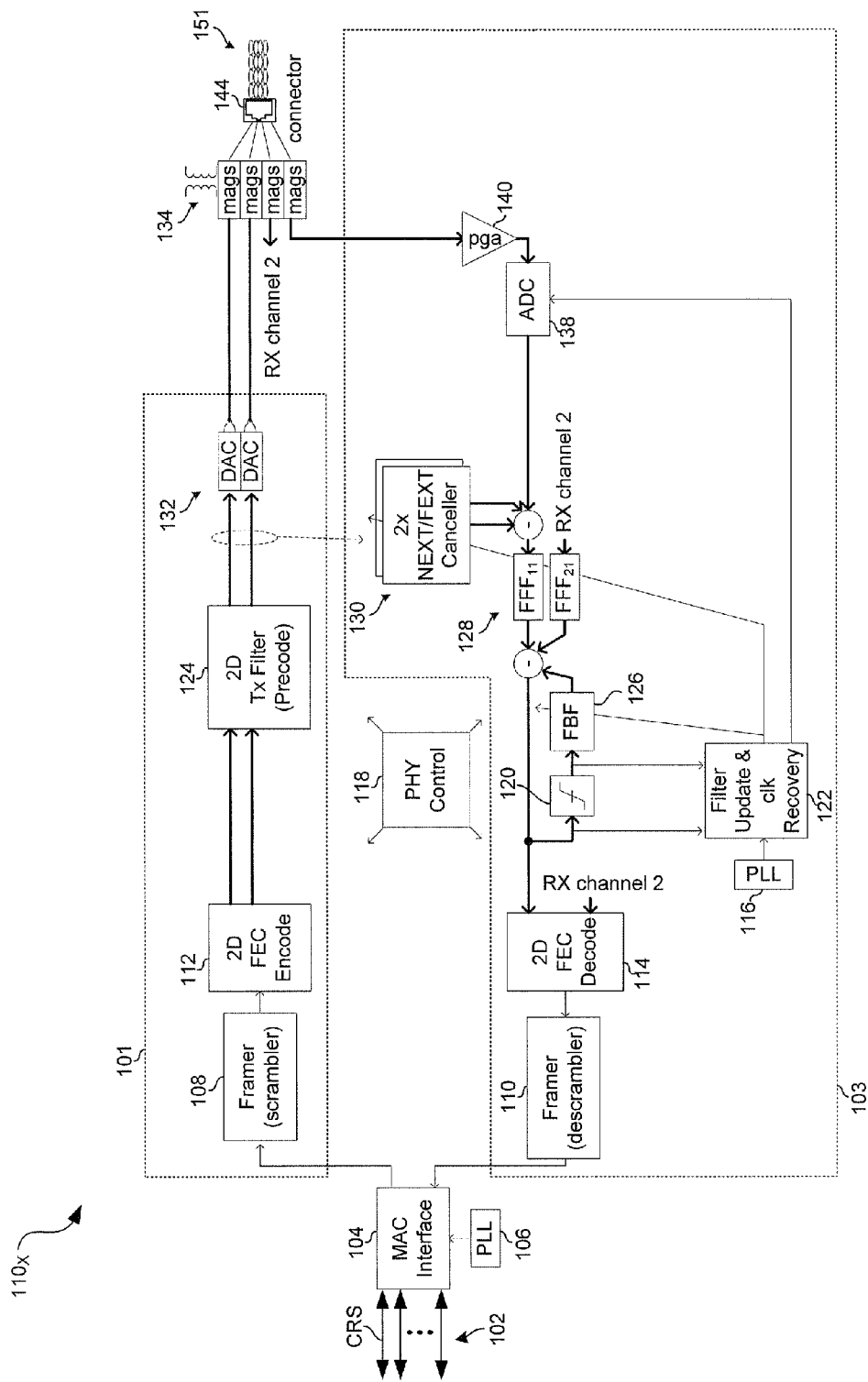
FIG. 1D is a diagram illustrating an exemplary baseband Ethernet PHY configured for simplex communication, in accordance with an embodiment of the invention.

In an exemplary embodiment of the invention, the baseband Ethernet PHY 110$_X$ may be configured into simplex or duplex operation based on characteristics of the cable 151. In this regard, FIG. 1C depicts and exemplary duplex configuration and FIG. 1D depicts and exemplary simplex configuration. That is, the components or portions of the baseband Ethernet PHY 110$_X$ present in FIG. 1C and absent in FIG. 1D may be enabled for duplex operation and disable for simplex operation. For example, the echo cancellation module 136 and the hybrid 142, in the baseband Ethernet PHY 110 may be disabled for simplex operation. Additionally, features and/or portions of the FEC encoder 112, the FEC decoder 114, the FFF 128, the crosstalk cancellation module 130, and the DAC 132 and may be disabled and/or slowed down.

FIG. 1D is a diagram illustrating an exemplary baseband Ethernet PHY configured for simplex communication, in accordance with an embodiment of the invention. Referring to FIG. 1D, there is shown the baseband Ethernet PHY 110$_X$ configured for a simplex mode of communication. In an exemplary embodiment of the invention, the baseband Ethernet PHY 110$_X$ may transmit on two twisted pairs and simultaneous receive on the other two twisted pairs. However, the invention is not limited with regard to the total number of pairs over which the baseband Ethernet PHY 110$_X$ communicates. For example, for 40 Gbps communications in each direction, twisted pairs 1 and 2 may be utilized for transmit and twisted pairs 3 and 4 may be utilized for receive.

In some embodiments of the invention, the number of pairs utilized for each direction of traffic may vary and may be configurable. In this regard, which channels 152 of the cable 151 are used for outbound traffic and which channels 152 of the cable 151 are used for inbound traffic may be determined based on, for example, types of traffic communicated, applications running on the network device $150_X$ and/or its link partner, the role or function of the network device $102_X$, and/or traffic patterns. For example, if traffic transmitted by the Ethernet PHY $110_X$ is typically greater than traffic received by the Ethernet PHY $110_X$, then 3 twisted pairs may be utilized to transmit and 1 pair may be utilized to receive.

Figure 2A:
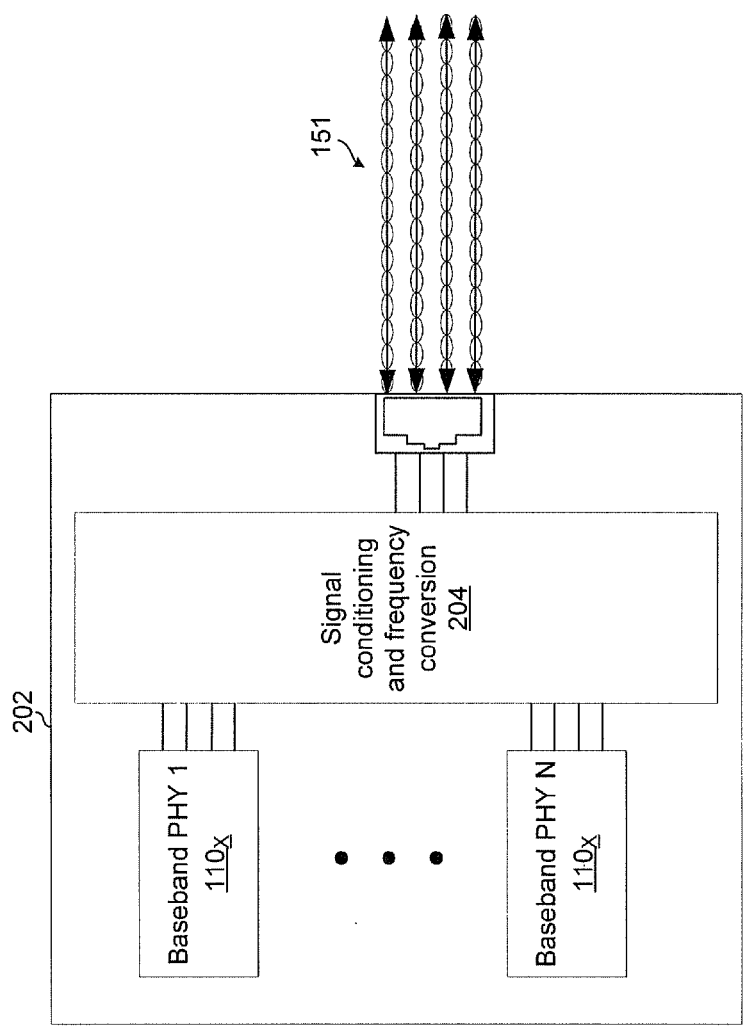
FIG. 2A is a diagram of a multi-band Ethernet PHY, in accordance with an embodiment of the invention.

FIG. 2A is a diagram of a multi-band Ethernet PHY, in accordance with an embodiment of the invention. Referring to FIG. 2A, the multi-band Ethernet PHY 202 may effectively comprise plurality, N, of baseband Ethernet PHYs $110_X$ and module 204. In an exemplary embodiment of the invention, the multi-band Ethernet PHY 202 may be implemented in the networking subsystem $156_X$ and may interface with the host $154_X$ in much the same manner as the baseband Ethernet PHY $110_X$. That is, replacing the baseband Ethernet PHY $110_X$ with the multi-band Ethernet PHY 202 in the network device $150_X$ may be straightforward with a scaling and/or adaptation of the MAC and/or other interfaces between the PHY and host.

The module 204 may comprise suitable logic, circuitry, interfaces, and/or code to generate and transmit, or receive and decode, a composite Ethernet signal. In this regard, the module 204 may be operable to perform frequency conversion, signal conditioning, and/or other signal processing functions to enable two or more of the baseband Ethernet PHYs $110_X$ to simultaneously communicate over the cable 151.

In operation, the multi-band Ethernet PHY 202 may be configured in a variety of ways. In various embodiments of the invention, the multi-band Ethernet PHY 202 may be configured based on, for example, characteristics of the cable 151 and/or power consumption constraints and/or requirements.

Configuration of the multi-band PHY 202 may comprise selecting which one or more of the baseband Ethernet PHYs $110_X$ in the multi-band PHY 202 may be utilized for communicating over the cable 151. For example, a first portion of the N baseband Ethernet PHYs $110_X$ in the multi-band PHY 202 may be selected for communication over the cable 151 while a remaining portion of the N baseband Ethernet PHYs $110_X$ in the multi-band Ethernet PHY 202 may be disabled and/or selected for communication over another link (not shown) that is attached to the multi-band PHY 202.

Configuration may comprise adjusting a data rate at which each selected one of the baseband Ethernet PHYs $110_X$ in the multi-band PHY 202 communicates over the cable 151. In this regard, adjusting the data rate may comprise adjusting, for example, a modulation scheme used by one or more of the select baseband Ethernet PHYs $110_X$, adjusting one or more clock frequencies in one or more of the baseband Ethernet PHYs $110_X$, and/or adjusting inter-packet gap times of transmissions by one or more of the selected baseband PHYs $110_X$.

Configuration of the multi-band PHY 202 may comprise configuring each of the selected baseband Ethernet PHYs $110_X$ to operate in simplex or duplex mode. For example a first selected baseband Ethernet PHY $110_X$ may be configured to communicate simplex of channels 1 and 2 of the cable 151 and a second selected baseband Ethernet PHY $110_X$ may be configured to communicate duplex over channels 3 and 4 of the cable 151.

Configuration of the multi-band PHY 202 may comprise configuring a number of channels of the cable 151 over which each of the selected baseband Ethernet PHYs $110_X$ communicates. For example, if the multi-band PHY 202 is operable to communicate at 40 Gbps, one exemplary embodiment of the invention may support four separate and distinct 10 Gbps second connections, two connections over two twisted pairs each, or one connections over 3 twisted pairs and another connection over 1 twisted pair.

Figure 2B:
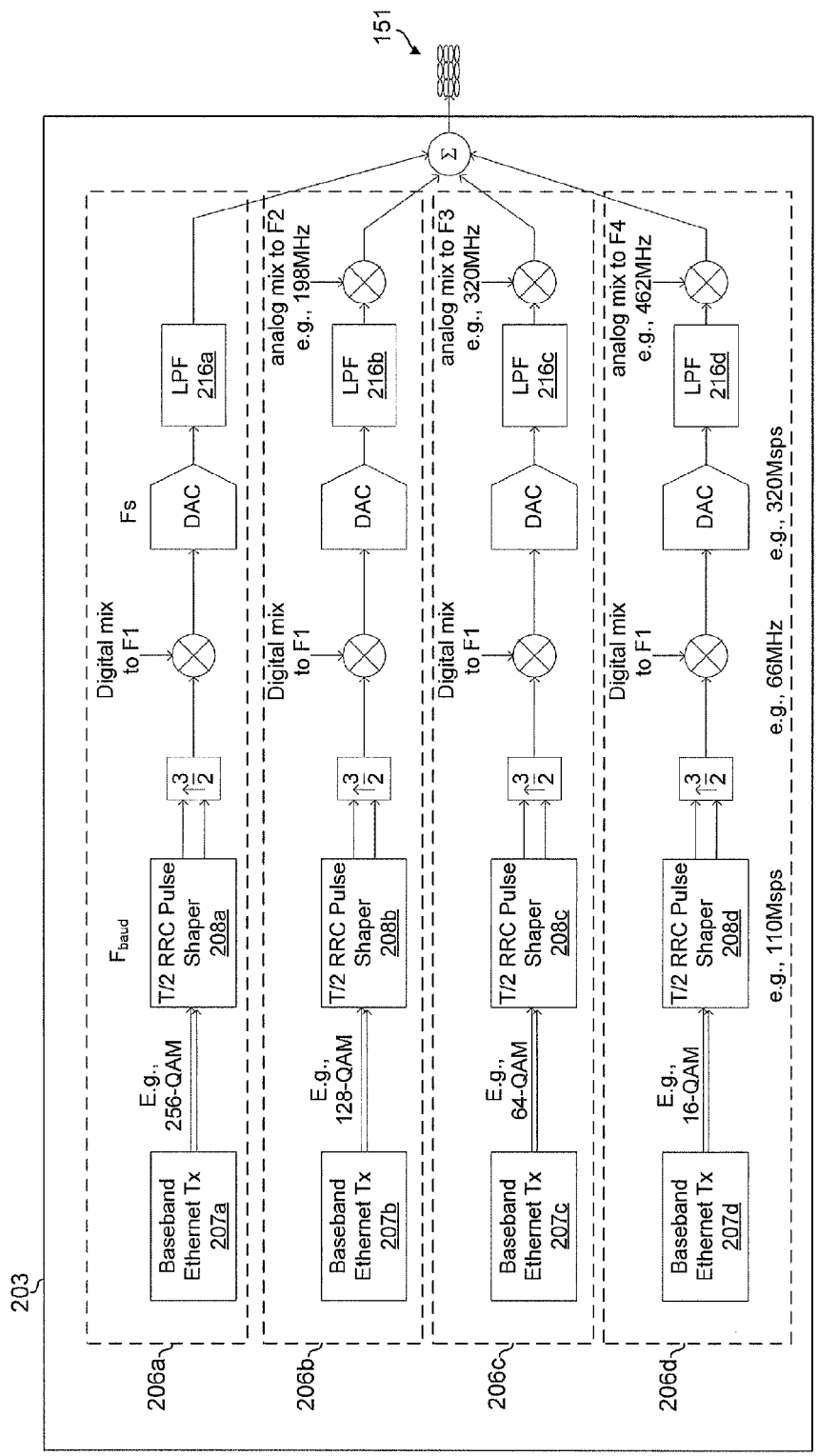
FIG. 2B is a block diagram illustrating a transmit portion of an exemplary multi-band Ethernet PHY, in accordance with an embodiment of the invention.

FIG. 2B is a block diagram illustrating a transmit portion of an exemplary multi-band Ethernet PHY, in accordance with an embodiment of the invention. Referring to FIG. 2B, there is shown a transmit portion 203 of a multi-band Ethernet PHY 202. The transmit portion 203 may comprise a plurality of transmit paths 206. Each of the transmit paths 206 may comprise a baseband transmit portion 207 that may be similar to or the same as the transmit portion 101 described with respect to FIG. 1C.

In operation, each transmit path 206 may transmit on a designated frequency band. In this regard, frequency division multiplexing may be utilized to allow, in effect, multiple baseband Ethernet PHYs $110_X$ to simultaneously communicate over a single cable 151. In this manner, aggregate data rates on the cable 151 may be increased over a baseband system via parallel paths. For an exemplary embodiment of the invention having four Transmit paths 206, if each baseband transmit portion 207 is operable to communicate at 10 Gbps, then an aggregate data rate of 40 Gbps may be achieved, but with many operating parameters, such as clock speed, relaxed as compared to a single baseband Ethernet PHY $110_X$ operating at 40 Gbps. That is, four instances of a baseband Ethernet PHYs $110_X$ operable to support, for example, 10 Gbps may be utilized to achieve 40 Gbps with little or no change to the transmit portion 101 (FIG. 1C) of the baseband Ethernet PHYs $110_X$.

In various embodiments of the invention, the effective data rate of each transmit path 206 may be configured independent of and/or in conjunction with the other transmit paths 206. Exemplary ways in which the data rate may be controlled comprise controlling the symbol rate, controlling the encoding or modulation scheme utilized, controlling the inter frame gap (IFG) time, and controlling the number of channels of the cable 151 that are associated with a transmit path 206. For example, the transmit path 206a may utilize a higher number of encoding levels than the transmit path 206b which may utilize a higher number of encoding levels than transmit path 206c, and so on. In this regard, a transmit path assigned to a lower frequency band may be configured to communicate at a higher data rate than a transmit path that communicates on a higher frequency band to take advantage of the better signal characteristics of the cable 151 at lower frequencies. Also, controlling a data rate on one or more channels may be utilized to implement efficient Ethernet (EEE) techniques such as low-power idle and sub-rating (which for copper PHYs includes "subset-PHY") in the PHY 202.

In various embodiments of the invention, a transmit portion 203 of a multi-band Ethernet PHY 202 may comprise a subset of the modules depicted in FIG. 2B and/or may comprise additional modules and/or functionality. Also, various modules and/or functions depicted as occurring in the digital domain may be implemented in the analog domain, and visa versa.

Figure 2C:
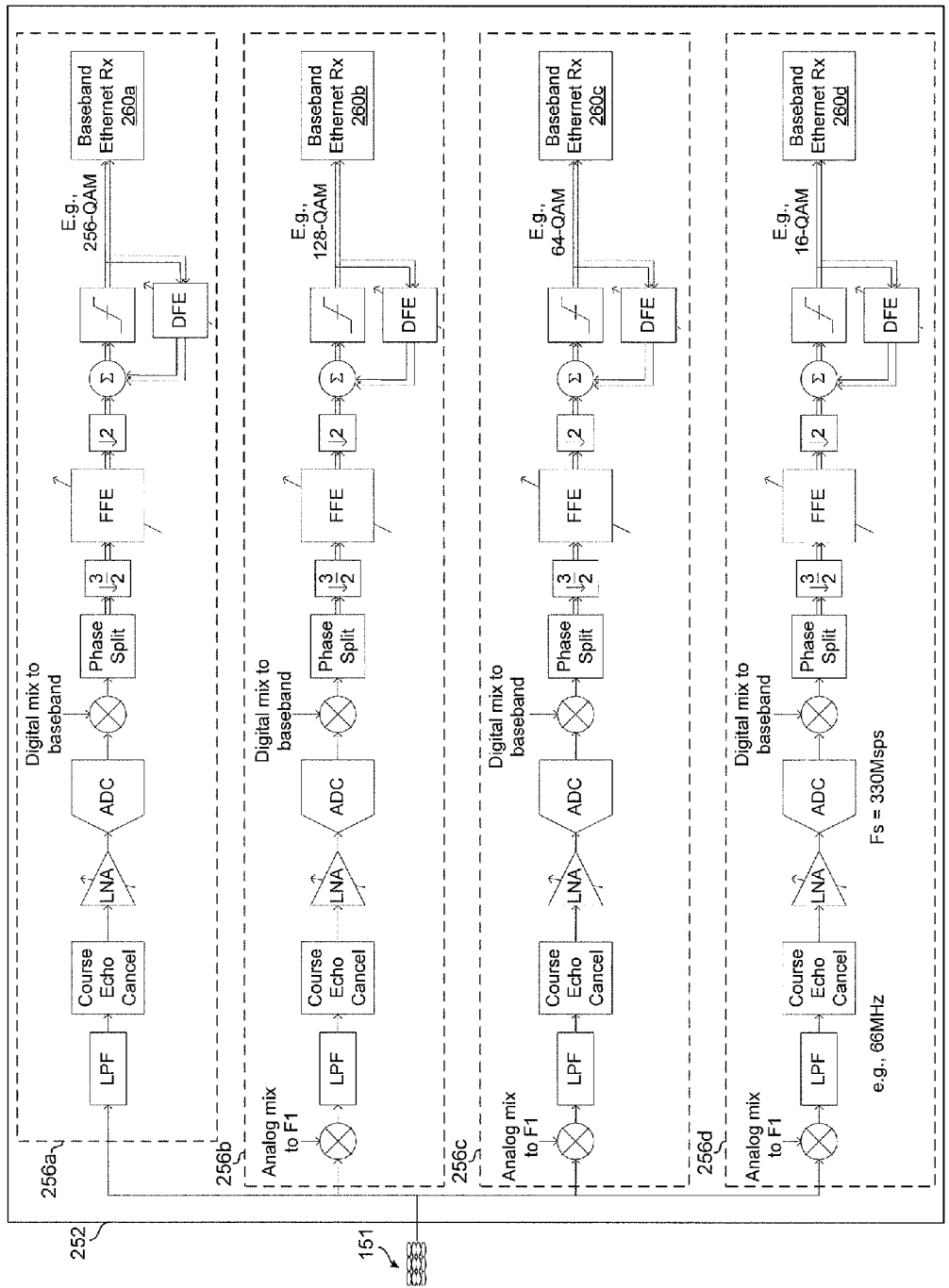
FIG. 2C is a block diagram illustrating a receive portion of a multi-band Ethernet PHY, in accordance with an embodiment of the invention.

FIG. 2C is a block diagram illustrating a receive portion of a multi-band Ethernet PHY, in accordance with an embodiment of the invention. Referring to FIG. 2C, there is shown a receive portion 252 of a multi-band Ethernet PHY 202. The receive portion 252 may comprise a plurality of receive paths 256. Each receive path 256 may comprise a baseband receive portion 260 that may be similar to or the same as the receive portion 103 described with respect to FIG. 1C.

In operation, each receive path 256 may receive on a designated frequency band. In this regard, frequency division multiplexing may be utilized to allow, in effect, multiple baseband Ethernet PHYs $110_X$ to simultaneously communicate over a single cable 151. In this manner, aggregate data rates on the cable 151 may be increased over a baseband system via parallel paths. For an exemplary embodiment of the invention having four receive paths 256, if each baseband receive portion 260 is operable to communicate at 10 Gbps, then an aggregate data rate of 40 Gbps may be achieved, but with many operating parameters, such as clock speed, relaxed as compared to the baseband Ethernet PHY $110_X$ operating at 40 Gbps. That is, four instances of a baseband Ethernet PHYs $110_X$ operable to support, for example, 10 Gbps may be utilized to achieve 40 Gbps with little or no change to the receive portion 103 (FIG. 1C) of the baseband Ethernet PHYs $110_X$.

In various embodiments of the invention, the effective data rate of each receive path 256 may be configured independent of and/or in conjunction with the other receive paths 256. Exemplary ways in which the data rate of each receive path may be controlled include controlling the symbol rate, controlling the modulation and/or encoding scheme utilized, controlling the inter frame gap (IFG) time, and controlling the number of channels of the cable 151 associated with a receive path 256. For example, the receive path 256a may utilize a higher number of encoding levels than the receive path 256b which may utilize a higher number of encoding levels than receive path 256c, and so on. In this regard, a receive path 256 assigned to a lower frequency band may be configured to communicate at a higher data rate than a receive path 256 that communicates on a higher frequency band to take advantage of the better signal characteristics of the cable 151 at lower frequencies. Also, controlling a data rate on one or more channels may be utilized to implement efficient Ethernet (EEE) techniques such as low-power idle and sub-rating (which for copper PHYs includes "subset-PHY") in the multi-band Ethernet PHY 202.

In various embodiments of the invention, a receive portion 252 of the multi-band Ethernet PHY 202 may comprise a subset of the modules depicted in FIG. 2C and/or may comprise additional modules and/or functionality. Also, various modules and/or functions depicted as occurring in the digital domain may be implemented in the analog domain, and visa versa.

Figure 3:
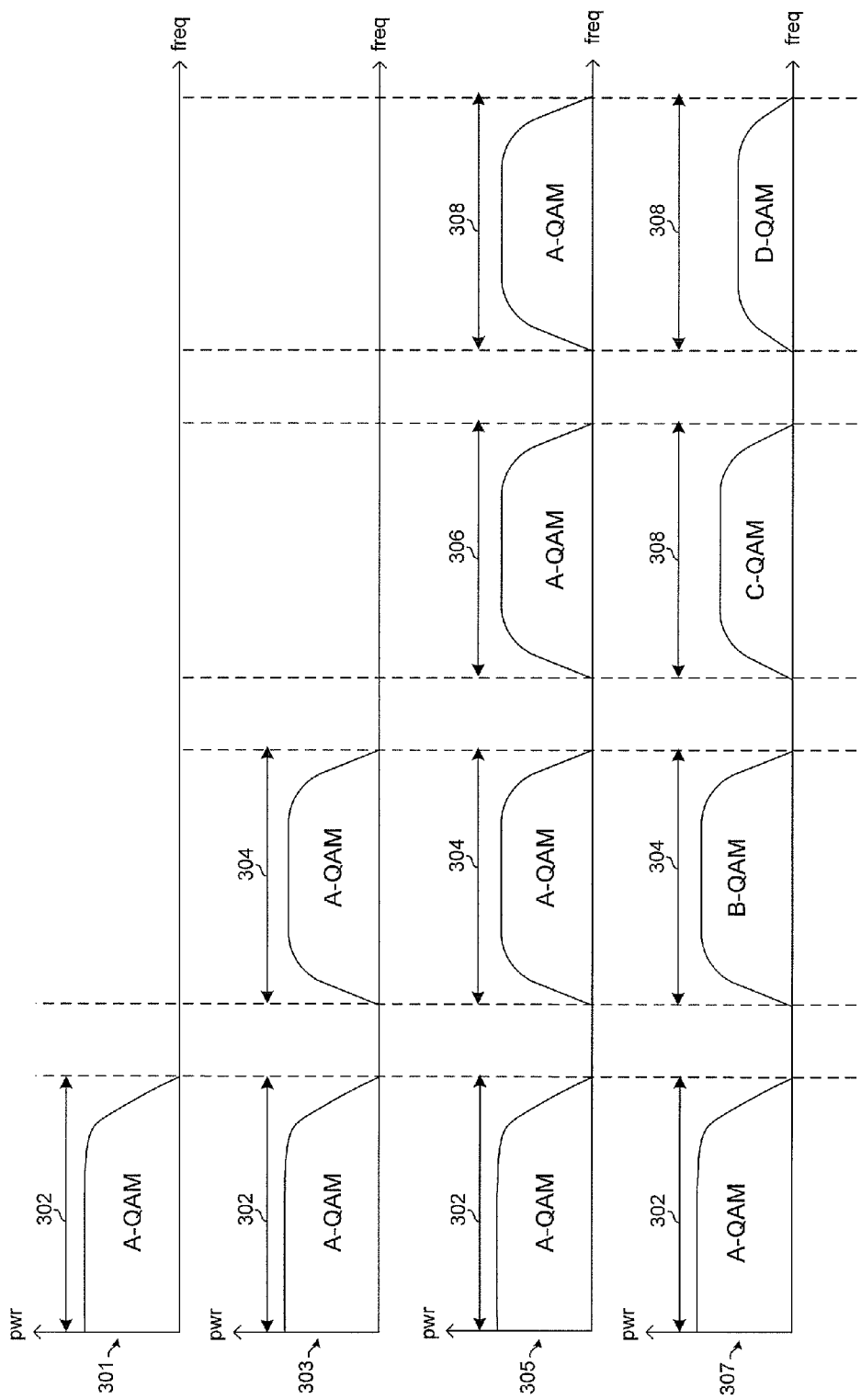
FIG. 3 is a diagram illustrating frequency characteristics of a baseband Ethernet PHY and a multi-band PHY, in accordance with an embodiment of the invention.

FIG. 3 is a diagram illustrating frequency characteristics of a baseband Ethernet PHY and a multi-band PHY, in accordance with an embodiment of the invention. Referring to FIG. 3, there is shown spectrum 301, spectrum 303, spectrum 305, and spectrum 307.

In this regard, a multi-band Ethernet PHY may utilize frequency division multiplexing such that higher data rates may be achieved via parallel circuitry as opposed to, for example, running a baseband Ethernet PHY faster. In this regard, in the multi-band system, a composite Ethernet signal may be generated by frequency shifting one or more baseband Ethernet signals and combining the shifted and unshifted baseband Ethernet signals.

The spectrum 301 illustrates an exemplary configuration in which a single baseband Ethernet PHY $110_X$ of the multi-band PHY 202 is selected for communication over the cable 151. The selected baseband Ethernet PHY $110_X$ communicates utilizing 'A'-QAM modulation on a frequency band 302, where 'A' is an integer greater than zero and may be, for example, 16, 32, 64, 128, or 256. For example, spectrum 301 may correspond to a configuration in which the selected baseband Ethernet PHY $110_X$ communicates at 10 Gbps utilizing 256-QAM after determining the cable 151 to be a Cat-5e cable.

The spectrum 303 illustrates an exemplary configuration in which two baseband Ethernet PHYs $110_X$ of the multi-band PHY 202 are selected for communication over the cable 151. The selected baseband PHYs $110_X$ may communicate utilizing 'A'-QAM. In this regard, communications of one of the selected baseband Ethernet PHYs $110_X$ is shifted to the frequency band 306. For example, the spectrum 303 may correspond to a configuration in which each of the two selected baseband Ethernet PHYs $110_X$ in the multi-band PHY 202 communicates at 10 Gbps utilizing 256-QAM after determining the cable 151 to be a Cat-7a cable.

The spectrum 305 illustrates an exemplary configuration in which four baseband Ethernet PHYs $110_X$ of the multi-band PHY 202 are selected for communication over the cable 151. The selected baseband PHYs $110_X$ may communicate utilizing 'A'-QAM. In this regard, communications of three of the selected baseband Ethernet PHYs $110_X$ are shifted to the frequency bands 304, 306, and 308, respectively. For example, the spectrum 305 may correspond to a configuration in which each of the four selected baseband Ethernet PHYs $110_X$ in the multi-band PHY 202 communicates at 10 Gbps utilizing 256-QAM after determining the cable 151 to be a Cat-7a+ cable.

The spectrum 307 illustrates an exemplary configuration in which four baseband Ethernet PHYs $110_X$ of the multi-band PHY 202 are selected for communication over the cable 151. The selected baseband Ethernet PHYs $110_X$ may communicate utilizing 'A'-QAM, 'B'-QAM, 'C'-QAM, and 'D'-QAM, respectively, where each of 'A', 'B', 'C', and 'D' in an integer and may be, for example, 16, 32, 64, 128, or 256. For example, the spectrum 307 may correspond to a configuration in which a the cable 151 is detected to be Cat-5e and the multi-band PHY 202 is configured such that: a first selected baseband Ethernet PHY $110_X$ communicates on band 302 utilizing 256-QAM, a second selected baseband Ethernet PHY $110_X$ is frequency shifted and communicates on band 304 utilizing 128-QAM, a third selected baseband Ethernet PHY $110_X$ communicates on band 306 utilizing 64-QAM, and a fourth selected baseband Ethernet PHY $110_X$ communicates on band 308 utilizing 16-QAM.

Although FIG. 3 utilizes QAM for illustration, the invention is not so limited and other encoding and/or modulation techniques such as PAM may be utilized. In this regard, the type of modulation and/or encoding utilized may be configured instead of or in addition to configuring the number of modulation or encoding levels.

Figure 4:
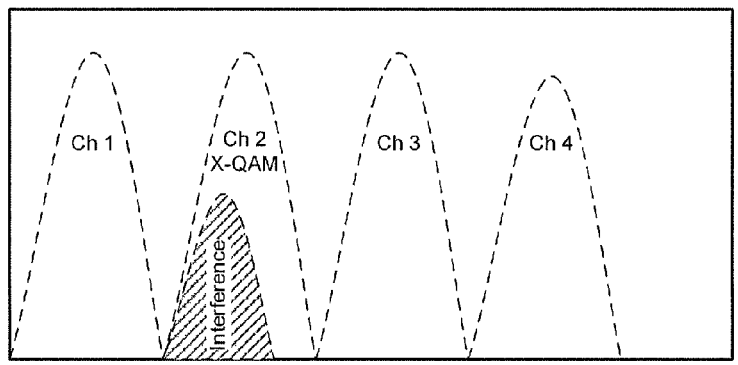
FIG. 4 is a diagram illustrating detection and mitigation of interference in a multi-band Ethernet PHY, in accordance with an embodiment the invention.
Figure 4:
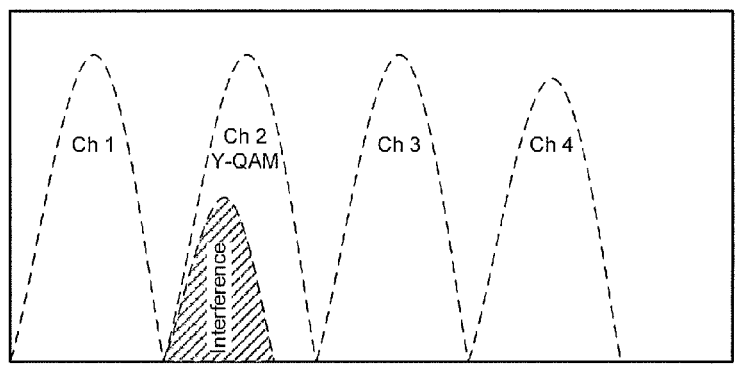
Figure 4:
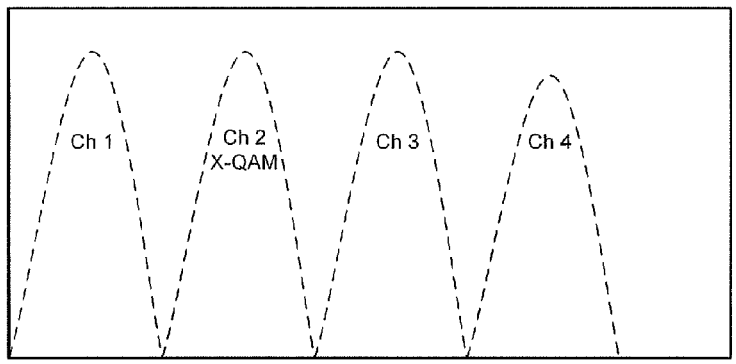

FIG. 4 is a diagram illustrating detection and mitigation of interference in a multi-band Ethernet PHY, in accordance with an embodiment the invention. Referring to FIG. 4, there is shown a power spectral density graph of the activity on a cable that couples two multi-band Ethernet PHYs 202. At time T1, the Ethernet PHYs, or link partners with which they are associated, may detect interference on channel 2. At time T2, responsive to the detection of the interference, the link partners may reduce the data rate on the channel 2. For example, the link partners may reduce the number of encoding levels and/or may stop communicating on channel 2 until the interference subsides at time T3, at which time communicates resume at the previous data rate. Accordingly, the multi-band PHY 202, and/or a link partner with which an Ethernet PHY 202 is associated, may be operable to report detected interference to a link partner and/or negotiate a different data rate and/or other techniques for mitigating interference.

Figure 5:
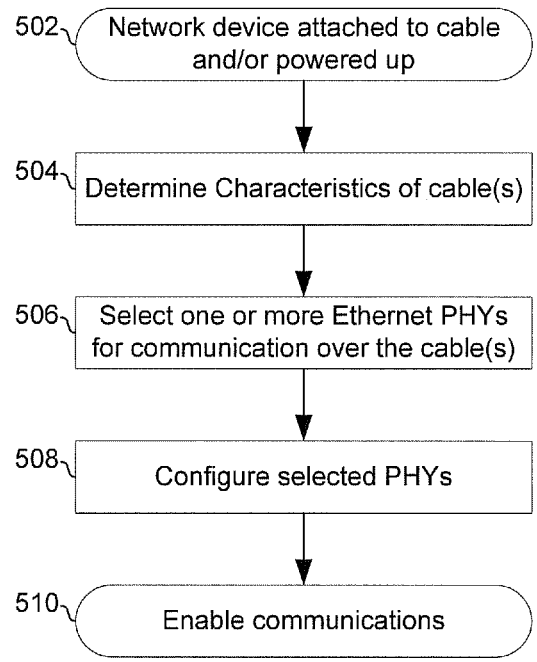
FIG. 5 is a flow chart illustrating exemplary steps for configuring a network device based on cable characteristics, in accordance with an embodiment of the invention.

FIG. 5 is a flow chart illustrating exemplary steps for configuring a network device based on cable characteristics, in accordance with an embodiment of the invention. Referring to FIG. 5 the exemplary steps begin with step 502 in which a network device comprising a plurality of baseband Ethernet PHYs is powered up and/or coupled to a cable. In step 504, the network device may determine characteristics of one or more cables to which it is coupled. In step 506, for each cable coupled to the network device, the network device may select one or more of the baseband Ethernet PHYs for communication over that cable based, at least in part, on the characteristics of the one or more cables. In this regard, each baseband Ethernet PHY may be selected for communications over a cable or may be disabled if not necessary for communicating over any cables. In step 508, each selected baseband Ethernet PHYs may be configured based, at least in part, on characteristics of the cable it has been selected to communicate over. Other supporting logic, circuitry, interfaces, and/or code, such as the block 204 of FIG. 2A, may be also configured based, at least in part, on which baseband Ethernet PHYs have been selected and/or the determined characteristics of the cable. In step 510, the network device may begin communicating over the one or more cables via the selected and configured PHYs.

In an exemplary embodiment of the invention, characteristics of a cable 151 attached to a network device $150_X$ may be determined and the network device may be configured based on the determined characteristics. One or more of a plurality of Ethernet PHYs $110_X$ in the network device $150_X$ may be selected to be utilized for communicating over the cable 151 based on the determined characteristics of the cable 151. The selected Ethernet PHYs $110_X$ may be configured based on the determined characteristics. The cable 151 may comprise a twisted pair cable and the characteristics may comprise a category of the cable 151. The characteristics may comprise whether the cable 151 is shielded. The characteristics may comprise a length of the cable 151. A modulation scheme utilized by the selected Ethernet PHYs $110_X$ may be configured based on the determined characteristics. A modulation scheme utilized by each of the selected Ethernet PHYs $110_X$ may be configured independently from a modulation scheme utilized by other ones of the selected Ethernet PHYs $110_X$. One or more of the selected Ethernet PHYs $110_X$ may be configured based on interference present on the cable 151.

One or more of the selected Ethernet PHYs $110_X$ may be configured to operate in duplex or simplex mode for communication over the cable 151 based on the determine characteristic. For one or more selected Ethernet PHYs operating in simplex mode, which channels 152 of the cable 151 may be utilized for outbound traffic and which channels 152 may be utilized for inbound traffic may be configured based on one or more of: traffic patterns on the cable 151, one or more applications running on the network device $150_X$, one or more applications running on a link partner communicatively coupled to the network device $150_X$, and functions performed by the networking device $150_X$.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for link adaptive Ethernet communications.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   determining characteristics of a network cable attached to a network device, the network cable comprising a plurality of twisted wire pairs, and the network device comprising a plurality of baseband Ethernet physical layer devices;
   configuring two or more of the plurality of baseband Ethernet physical layer devices for data transmission operation over the network cable using the determined characteristics of the network cable, a first of the two or more of the plurality of baseband Ethernet physical layer devices operating in a baseband frequency spectrum of the plurality of twisted wire pairs, and a second of the two or more of the plurality of baseband Ethernet physical layer devices operating in a second frequency spectrum of the plurality of twisted wire pairs, the second frequency spectrum higher in frequency as compared to the baseband frequency spectrum; and
   transmitting over the network cable using the configured two or more of the plurality of baseband Ethernet physical layer devices, the first of the two or more of the plurality of baseband Ethernet physical layer devices transmitting data at a higher data rate than the second of the two or more of the plurality of baseband Ethernet physical layer devices in response to the first of the two or more of the plurality of baseband Ethernet physical layer devices operating in a lower frequency spectrum than the second of the two or more of the plurality of baseband Ethernet physical layer devices.

2. The method of claim 1, wherein the configuring comprises configuring a modulation scheme for the first of the two or more baseband Ethernet physical layer devices and for the second of the two or more baseband Ethernet physical layer devices using the determined characteristics.

3. The method of claim 1, wherein the first of the two or more baseband Ethernet physical layer devices uses a first modulation scheme, and the second of the two or more baseband Ethernet physical layer devices uses a second modulation scheme, the first modulation scheme different from the second modulation scheme.

4. The method of claim 1, wherein the characteristics include a category of the network cable.

5. The method of claim 1, wherein the characteristics include whether the network cable is shielded.

6. The method of claim 1, wherein the characteristics include a length of the network cable.

7. The method of claim 1, wherein the configuring comprises configuring a baseband Ethernet physical layer device using interference present on the network cable.

8. The method of claim 1, wherein the configuring comprises configuring a baseband Ethernet physical layer device to operate in a duplex or simplex mode using the determined characteristics.

9. The method according to claim 1, wherein each of the plurality of baseband Ethernet physical layer devices has a M Gbit/s data transmission capacity, M being a number.

10. A system for networking, the system comprising:
one or more processors and/or circuits for use in a network device, the one or more processors and/or circuits configured to:
determine characteristics of a network cable attached to the network device, the network cable comprising a plurality of twisted wire pairs, and the network device comprising a plurality of baseband Ethernet physical layer devices;
configure two or more of the plurality of baseband Ethernet physical layer devices for data transmission operation over the network cable using the determined characteristics of the network cable, wherein a first of the two or more of the plurality of baseband Ethernet physical layer devices is configured to operate in a baseband frequency spectrum of the plurality of twisted wire pairs, and a second of the two or more of the plurality of baseband Ethernet physical layer devices is configured to operate in a second frequency spectrum of the plurality of twisted wire pairs, the second frequency spectrum higher in frequency as compared to the baseband frequency spectrum; and
transmit over the network cable using the configured two or more of the plurality of baseband Ethernet physical layer devices, wherein the first of the two or more of the plurality of baseband Ethernet physical layer devices is configured to transmit data at a higher data rate than the second of the two or more of the plurality of baseband Ethernet physical layer devices in response to the first of the two or more of the plurality of baseband Ethernet physical layer devices operating in a lower frequency spectrum than the second of the two or more of the plurality of baseband Ethernet physical layer devices.

11. The system according to claim 10, further comprising the one or more processors and/or circuits configured to configure a modulation scheme for the first of the two or more baseband Ethernet physical layer devices and for the second of the two or more baseband Ethernet physical layer devices using the determined characteristics.

12. The system according to claim 10, wherein the first of the two or more baseband Ethernet physical layer devices uses a first modulation scheme, and the second of the two or more baseband Ethernet physical layer devices uses a second modulation scheme, the first modulation scheme different from the second modulation scheme.

13. The system according to claim 10, wherein the characteristics include a category of the network cable.

14. The system according to claim 10, wherein the characteristics include whether the network cable is shielded.

15. The system according to claim 10, wherein the characteristics include a length of the network cable.

16. The system according to claim 10, wherein each of the plurality of baseband Ethernet physical layer devices has a M Gbit/s data transmission capacity, M being a number.

17. A non-transitory computer-readable medium having machine instructions stored therein, the instructions when executed by one or more processors, causing the one or more processors to perform operations comprising:
determining characteristics of a network cable attached to a network device, the network cable comprising a plurality of twisted wire pairs, and the network device including a plurality of baseband Ethernet physical layer devices comprising a first baseband Ethernet physical layer device and a second baseband Ethernet physical layer device;
configuring the first baseband Ethernet physical layer device and the second baseband Ethernet physical layer device for data transmission operation over the network cable using the determined characteristics of the network cable, the first baseband Ethernet physical layer device operating in a baseband frequency spectrum of the plurality of twisted wire pairs, and the second baseband Ethernet physical layer device operating in a second frequency spectrum of the plurality of twisted wire pairs, the second frequency spectrum higher in frequency as compared to the baseband frequency spectrum; and
transmitting over the network cable using the first baseband Ethernet physical layer device and the second baseband Ethernet physical layer device, the first baseband Ethernet physical layer device transmitting data at a higher data rate than the second baseband Ethernet physical layer device in response to the first baseband Ethernet physical layer device operating in a lower frequency spectrum than the second baseband Ethernet physical layer device.

18. The non-transitory computer-readable medium of claim 17, wherein the configuring comprises configuring a modulation scheme for the first baseband Ethernet physical layer device and for the second baseband Ethernet physical layer device using the determined characteristics.

19. The non-transitory computer-readable medium of claim 17, wherein the first baseband Ethernet physical layer device uses a first modulation scheme, and the second baseband Ethernet physical layer device uses a second modulation scheme, the first modulation scheme different from the second modulation scheme.

20. The non-transitory computer-readable medium of claim 17, wherein the characteristics include at least one of a category of the network cable, whether the network cable is shielded, or a length of the network cable.

* * * * *